United States Patent
Vishwakarma et al.

(10) Patent No.: US 11,018,991 B1
(45) Date of Patent: May 25, 2021

(54) SYSTEM AND METHOD FOR AUTONOMOUS AND DYNAMIC RESOURCE ALLOCATION IN STORAGE SYSTEMS

(71) Applicant: EMC IP Holding Company LLC, Hopkinton, MA (US)

(72) Inventors: Rahul Deo Vishwakarma, Bangalore (IN); Jayanth Kumar Reddy Perneti, Bangalore (IN); Gopal Singh, Lucknow (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/784,721

(22) Filed: Feb. 7, 2020

(51) Int. Cl.
| | |
|---|---|
| *H04L 12/911* | (2013.01) |
| *H04L 29/08* | (2006.01) |
| *G06N 7/00* | (2006.01) |
| *G06N 7/02* | (2006.01) |
| *G06F 9/50* | (2006.01) |
| *H04W 28/08* | (2009.01) |
| *G06N 3/04* | (2006.01) |

(52) U.S. Cl.
CPC ......... *H04L 47/823* (2013.01); *G06F 9/5055* (2013.01); *G06N 3/0436* (2013.01); *G06N 7/005* (2013.01); *G06N 7/023* (2013.01); *H04L 47/783* (2013.01); *H04L 67/1097* (2013.01); *H04W 28/0942* (2020.05); *G06F 2209/5019* (2013.01)

(58) Field of Classification Search
CPC . H04L 47/823; H04L 67/1097; H04L 47/783; G06N 3/0436; G06N 7/023; G06N 7/005; G06F 9/5055; G06F 2209/5019; H04W 28/0942
See application file for complete search history.

(56) References Cited

U.S. PATENT DOCUMENTS

| | | | |
|---|---|---|---|
| 8,112,755 B2 * | 2/2012 | Apacible ............... | G06F 9/5011 718/104 |
| 9,460,389 B1 | 10/2016 | Botelho et al. | |
| 2014/0310714 A1 * | 10/2014 | Chan ..................... | G06F 9/4881 718/102 |
| 2015/0173103 A1 * | 6/2015 | Lunden ................. | H04W 74/04 370/331 |
| 2018/0300174 A1 * | 10/2018 | Karanasos ............ | G06F 9/4881 |
| 2019/0163598 A1 * | 5/2019 | Harutyunyan .......... | G06F 9/542 |
| 2020/0120131 A1 * | 4/2020 | Soni ..................... | H04L 41/0896 |
| 2020/0151562 A1 * | 5/2020 | Pietquin ............... | G06N 3/0454 |

* cited by examiner

*Primary Examiner* — Michael A Keller
(74) *Attorney, Agent, or Firm* — Staniford Tomita LLP

(57) ABSTRACT

Embodiments are described for an autonomously and dynamically allocating resources in a distributed network based on forecasted a-priori CPU resource utilization, rather than a manual throttle setting. A multivariate (CPU idle %, disk I/O, network and memory) rather than single variable approach for Probabilistic Weighted Fuzzy Time Series (PWFTS) is used for forecasting compute resources. The dynamic throttling is combined with an adaptive compute change rate detection and correction. A single spike detection and removal mechanism is used to prevent the application of too many frequent throttling changes. Such a method can be implemented for several use cases including, but not limited to: cloud data migration, replication to a storage server, system upgrades, bandwidth throttling in storage networks, and garbage collection.

11 Claims, 15 Drawing Sheets

400

| Epoch | %usr | %nice | %sys | %iowait | %steal | %irq | %soft | %guest | %gnice | CPU Busy % |
|---|---|---|---|---|---|---|---|---|---|---|
| 1.55E+09 | 0.2 | 0 | 22.59 | 0.17 | 0 | 0 | 11.91 | 0 | 0 | 33.79873 |
| 1.55E+09 | 0.39 | 0 | 0.38 | 0.12 | 0 | 0 | 0 | 0 | 0 | 35.43446 |
| 1.55E+09 | 0.39 | 0 | 0.7 | 0.19 | 0 | 0 | 0 | 0 | 0 | 38.06586 |
| 1.55E+09 | 0.42 | 0 | 0.5 | 0.08 | 0 | 0 | 0 | 0 | 0 | 32.98087 |
| 1.55E+09 | 0.28 | 0 | 0.38 | 0.14 | 0 | 0 | 0 | 0 | 0 | 43.39976 |
| 1.55E+09 | 0.24 | 0 | 0.32 | 0.39 | 0 | 0 | 0 | 0 | 0 | 42.86637 |
| 1.55E+09 | 0.52 | 0 | 0.65 | 0.33 | 0 | 0 | 0 | 0 | 0 | 46.88457 |

402

| Epoch | Compute Busy% |
|---|---|
| 1546292100 | 39.79873409 |
| 1546292400 | 41.43446412 |
| 1546292700 | 44.06585592 |
| 1546293000 | 38.98086907 |
| 1546293300 | 49.39975819 |
| 1546293600 | 48.86636797 |
| 1546293900 | 52.88457436 |
| 1546294200 | 42.75016002 |
| 1546294500 | 46.16385748 |
| 1546294800 | 46.02162008 |
| 1546295100 | 48.83274 |
| 1546295400 | 50.23443 |

404

1050

| S. No. | Time stamp (epoch) | CPU Busy % | Disk IO % | Memory % |
|---|---|---|---|---|
| 1 | 1546292100 | 33.79873 | 21 | 48 |
| 2 | 1546292400 | 35.43446 | 24 | 52 |
| ... | ... | ... | ... | ... |
| 285 | 1546377000 | 37.65735 | 28 | 57 |

| S. No. | Time (epoch) | Compute Busy % |
|---|---|---|
| 1 | 1550791232 | 39.79873 |
| 2 | 1550859835 | 41.43446 |
| | ... | ... |
| 285 | 1578695422 | 47.65735 |

FIG. 10B

SYSTEM AND METHOD FOR AUTONOMOUS AND DYNAMIC RESOURCE ALLOCATION IN STORAGE SYSTEMS

TECHNICAL FIELD

Embodiments are generally directed to networked-based data backup systems, and more specifically to autonomously and dynamically allocating resources in the systems.

BACKGROUND

Large scale, distributed computer networks provide users access to large amounts of processing and storage resources. For example, Cloud networks provide a shared pool of configurable computing resources (e.g., computer networks, servers, storage, applications and services) that can be rapidly provisioned and released with minimal management effort. Cloud computing allows users with various capabilities to store and process their data in either a private cloud or public cloud (e.g., third-party owned cloud network) in order to make data access much more easy and reliable. Cloud networks are widely used for large-scale data backup operations by enterprises that process large amounts of data on a regular basis, such as weekly or daily company-wide backups.

Present network products provide ever increasing features implemented in storage products to provide better services and enhanced customer experience. As a result, there is an increased competition among processes for the compute resources when they are running concurrently. Therefore, finding an optimized approach for compute resource allocation in any storage system becomes one of the most challenging tasks. While most systems use throttling to regulate resources in real time, they cannot really know the future demand levels, and therefore, cannot truly determine the optimal throttling in all cases. Though manual throttling mechanisms are provided to allow direct user control, such methods require the user to change the throttle value repeatedly as the load on the system changes.

What is needed, therefore, is a system and method of providing dynamic throttling based on accurate forecasts of the network compute load, and that does not rely on direct user input to tailor resource availability to network needs.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost are trademarks of EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

FIG. 10A illustrates an example of a multivariate time series generated using the PWFTS method under some embodiments.

FIG. 10B illustrates an example of an n-step ahead forecast under some embodiments.

DETAILED DESCRIPTION

Figure 1:
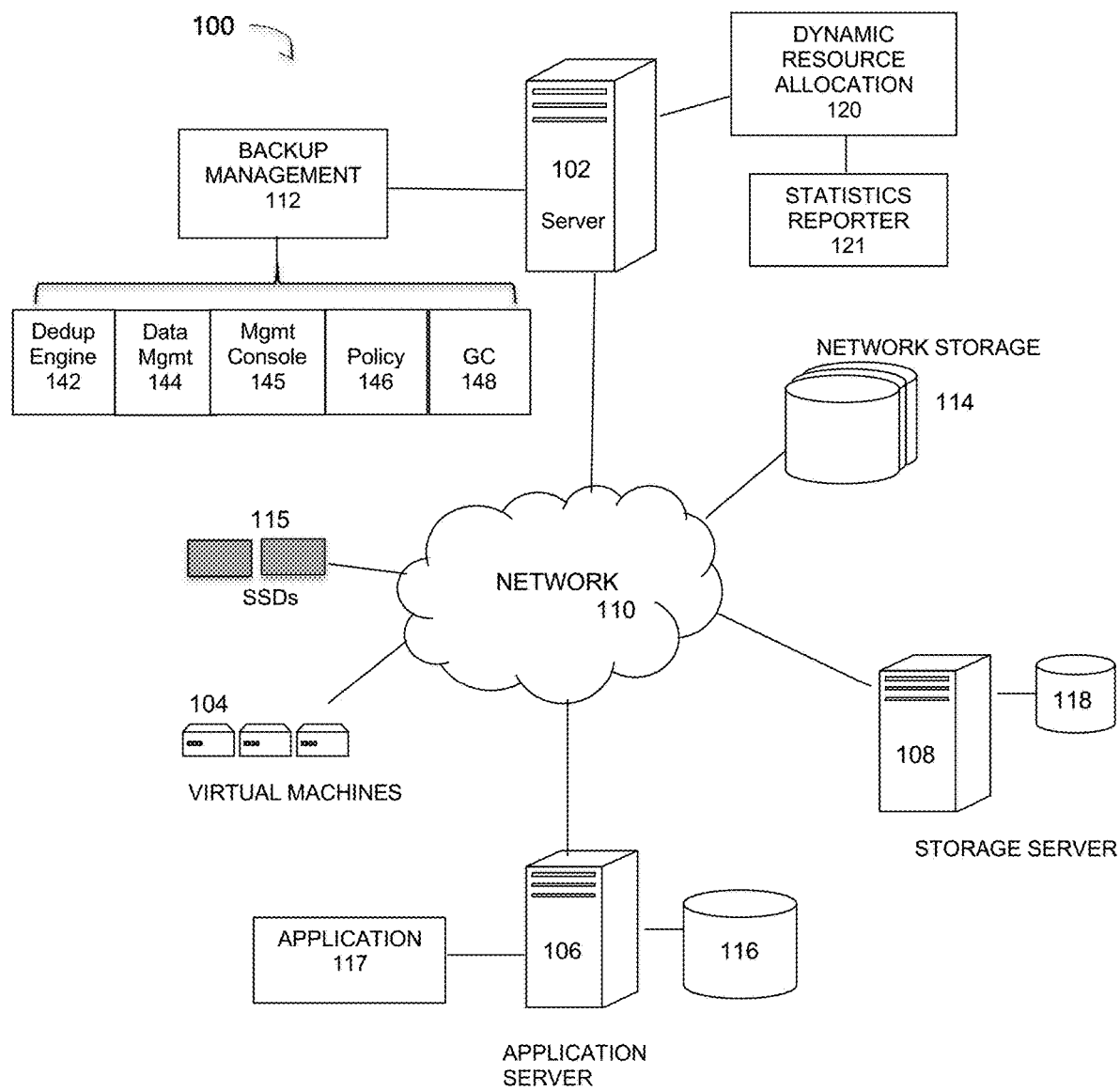
FIG. 1 illustrates a computer network system that implements one or more embodiments of a large-scale data backup network implementing a dynamic resource allocation mechanism, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the described embodiments encompass numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the embodiments. In this specification, these implementations may be referred to as techniques. In general, the order of the steps of disclosed processes may be altered within the scope of the described embodiments.

Some embodiments involve automated backup, recovery, and other data movement operations in a distributed system, such as a very large-scale wide area network (WAN), metropolitan area network (MAN), or cloud-based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

FIG. 1 illustrates a computer network system 100 that implements one or more embodiments of a large-scale data backup network implementing a dynamic resource allocation process and component. In system 100, a server (e.g., backup server) 102 executes certain applications including a backup management process 112. If the server 112 is a dedicated backup server, it executes a backup management process 112 to coordinate or manage the backup of data from one or more data sources 108 to storage devices, such as network storage 114, client or local storage, and/or virtual storage devices. With regard to virtual storage, any number of virtual machines (VMs) 104 or groups of VMs may be provided to serve as backup targets. The VMs or other network storage devices serve as target storage devices for data backed up from one or more data sources, such as computer 108, which may have attached local storage 118 or utilize networked accessed storage devices 114.

In an embodiment, the backup management process 112 may be an internal backup application executed locally by server 102 or it may be an external backup application. External applications could be applications such as an Oracle (or other) database data getting backed or restored from an EMC Data Domain file system (DDFS) system. Internal I/Os may be generated by the DDFS, such as garbage collection activity or file verification activities.

The data sourced by the data source may be any appropriate data, such as database data that is part of a database management system. In this case, the data may reside on one or more hard drives (e.g., 118 or 114) and may be stored in the database in a variety of formats. One example is an Extensible Markup Language (XML) database, which is a data persistence software system that allows data to be stored in XML format. Another example is a relational database management system (RDMS) which uses tables to store the information.

The network server computer 102 is coupled directly or indirectly to network storage, such as target VMs 104 or network storage 114, other storage servers 108, and to the data source 106 through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud computing platform. In an embodiment, system 100 may represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

The data generated or sourced by system 100 may be stored in any number of persistent storage locations and devices, such as local client storage, server storage (e.g., 118). The backup process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, the target storage devices, such as disk array 114 may represent any practical storage device or set of devices, such as fiber-channel (FC) storage area network devices, and OST (OpenStorage) devices. One or more of the storage devices may also be embodied in solid-state storage devices (SSD) or flash memory that feature fast access times, but are typically more expensive and lower storage capacities than hard disk drives (HDD). For the embodiment of FIG. 1, network storage 114 may be embodied as HDD devices, while separate SSD storage 115 may be provided separately as faster storage media.

In an embodiment, system 100 may represent a Data Domain Restorer (DDR)-based deduplication storage system, and storage server 128 may be implemented as a DDR Deduplication Storage server provided by EMC Corporation, though embodiments are not so limited and other similar backup and storage systems are also possible. In general, Data Domain is a purpose-built backup appliance providing streaming deduplication that is able to ingest data at full network speeds, from multiple backup sources while providing storage efficiency. Present Data Domain systems are able to use tiered data storage technologies, such as very large multi-terabyte SATA drive trays, or SSD-enabled fast ingest trays. Data Domain has a logical extension to its file system and MTree organization which allows a data movement policy to be applied to aging backup content. The Data Domain File System (DDFS) which is represented as an active tier and a cloud tier with a policy engine that moves backup data to the cloud tier when it reaches a minimum data age as stipulated in a policy setup dialogue. Metadata is stored on a physical cloud tier within the Data Domain to facilitate ease of file lookup and recall. Once the logical cloud unit is created, Data Domain will place a copy of the metadata stored on the cloud tier into the ECS Bucket via the Cloud Unit.

The Data Domain File System (DDFS) is an inline data deduplication file system. implements single-instance storage techniques to eliminates redundant copies of data to reduce storage overhead. Data compression methods are used to store only one unique instance of data by replacing redundant data blocks with pointers to the unique data copy. As new data is written to a system, duplicate chunks are replaced with these pointer references to previously stored data.

The backup system including server 102 represents any type of server or cluster of servers. In the example shown in FIG. 1, the backup system 100 includes a backup management application 112 that includes several components including a deduplication engine 142, data management engine 144, management console 145, policies 146, and garbage collector 148. It should be appreciated that the blocks shown in FIG. 1 may be functional and there can be many different hardware and software configurations to implement the functions described. Backups may further include compression operations to reduce the traffic over the network, encryption operations to secure the data, or both. Backups (e.g., secondary copies) may be stored in a format (e.g., compressed format or deduplicated format) that is different from a native format of the primary copies at the clients.

The backup management process 112 includes a data management unit 144 that is responsible for the overall management of the backed up data. Some of the data management tasks that the data management engine may perform or facilitate include configuring and connecting the cloud storages to the backup system, evaluating the policies to determine whether a data management operation should be performed, initiating and orchestrating the data management operation based on the policy evaluation, validating that the data management operation was successful, tracking the location of the backed up data (e.g., updating a backup catalog or other metadata indicating past and current location of a file that was originally backed up to the backup server), recalling the backed up data if requested, transmitting alerts or other notifications to the user about the status of a data management operation, managing retention periods, or combinations of these.

The policies 146 specify one or more rules defining data management operations or actions to be performed between the first and second cloud storages, and one or more conditions to satisfy in order to trigger the data management operations. Examples of data management operations include copying backup data from the first cloud storage to the second cloud storage, moving backup data from the first cloud storage to the second cloud storage, or synchronizing backup data between the first cloud storage and the second cloud storage. Conditions may be based on parameters such as file age, file size, or both. Rules can be inclusive (e.g., move data that matches this rule) or exclusive (e.g., move data that does not match this rule). The policies can be user-definable such as via a backup administrator of an organization.

The management console 145 is a user interface to the backup system. The user interface may be a graphical user interface (GUI) or command line (CL) interface. In an embodiment, another application may interface with the backup system through an application programming interface (API) exposed by the backup system. In a specific embodiment, the user (e.g., backup administrator of the organization) uses the management console to define the data management policies, specify the data management operations, specify and identify backup data subject to the data management operations, review calculated time estimates for completing the data management operations, prioritize data for the data management operations, configure alerts and notifications, identify and register the cloud storages for connection to the backup system, view a lifecycle of a file on the backup system (e.g., view times and dates when a file was backed up from a client to the backup server, migrated from the backup server to the first cloud storage, and migrated from the first cloud storage to the second cloud storage), view listings of files presently residing at the backup server, view listings of files presently residing at the first cloud storage, view listings of files presently residing at the second cloud storage, or combinations of these.

The garbage collector 148 is responsible for reclaiming backup storage space at the backup storage nodes. In an embodiment, when a file in the active tier is moved to the cloud tier (e.g., moved out of the backup system and to cloud storage), the file in the active tier is marked for deletion. Garbage collection policies can specify a periodic cleaning schedule during which the garbage collector runs a cleaning operation. The cleaning operation may include enumerating the files in the file system of the backup system to identify files marked for deletion. Since a garbage collection can consume a significant amount of resources, the garbage collection policies allow the user to specify the conditions (e.g., times) when garbage collection may be run.

The deduplication engine 142 performs the deduplication tasks described above with respect to storing only one unique instance of data by replacing redundant data blocks with pointers to the unique data copy to provide single-instance storage that eliminates redundant copies of data to reduce storage overhead.

As shown in FIG. 1, a number of different resources, such as storage media 104 and 114, application servers 106, storage servers 108, and other resources are available to the backup server and data sources of the system. Such resources are typically available in multi-tenant networks, virtual networks, and cloud network environments. In such large-scale or distributed systems, data can be moved to and from the cloud on a regular basis, and sometimes quite frequently in a way that taxes the resources available to the users of the system. In certain cases, it is helpful if data movement is limited or "throttled" such that resources are allocated most optimally to prioritized users or applications. As stated previously, as storage products increase features to improve customer usage, there is an increased competition among processes for system resources when they are running concurrently. Embodiments of system 100 include a dynamic resource allocation process and component 120 to compute and optimize compute resource allocation in the overall data processing and storage system.

The resources that can be throttled depend on the system configuration as well as the needs of the particular application or applications that are being run. In a distributed network system, such as shown in FIG. 1, the common system resources include processor (CPU) bandwidth, network bandwidth, memory capacity, and storage media (disk) input/output (I/O) capacity. Table 1 below lists certain example applications and the resources that are most commonly impacted by their use.

TABLE 1

| APPLICATION | RESOURCES |
| --- | --- |
| Cloud Data Movement | CPU, Network |
| Data Replication | Network, CPU, Disk I/O |
| System Upgrade | CPU, Memory |
| Data Storage | Network |
| Garbage Collection | CPU, Memory, Disk I/O |

As shown in the example of Table 1 above, certain applications impact many of the relevant resources (e.g., CPU, memory, and disk I/O), while others may impact only one or two of the relevant resources. Non-optimal and non-efficient use of the system often occurs when different applications compete for the same resource at the same time, thus leading to delays and enforced wait periods. The dynamic resource allocation method 120 automatically adjusts the amount of each resource available to the applications by decreasing an amount of a resource (applying a throttle) when predicted application demand is high or a resource is full, and increasing an amount of the resource (releasing the throttle) when predicted application demand is low or the resource is idle.

In present backup systems, setting the application usage relative to resource availability is performed by manual intervention and input by the user. This operation is scheduled by the user, based on his or her experience and expertise with system resource usage during the scheduled time window for the application. This method can work for certain organizations and certain times the user due to the fact that users can often infer the correct system utilization in normal circumstances. However, due to various reasons, such as a sudden request for backup/replication as a business operation demand, or fault/failure scenarios, there can be situations of unforeseen operational overhead for the business and the data movement throttle needs to be refined again based on learning these situations. In addition to this, resource allocation at present is controlled by the operating system in real-time, which may not be optimal for specific applications.

Figure 2:
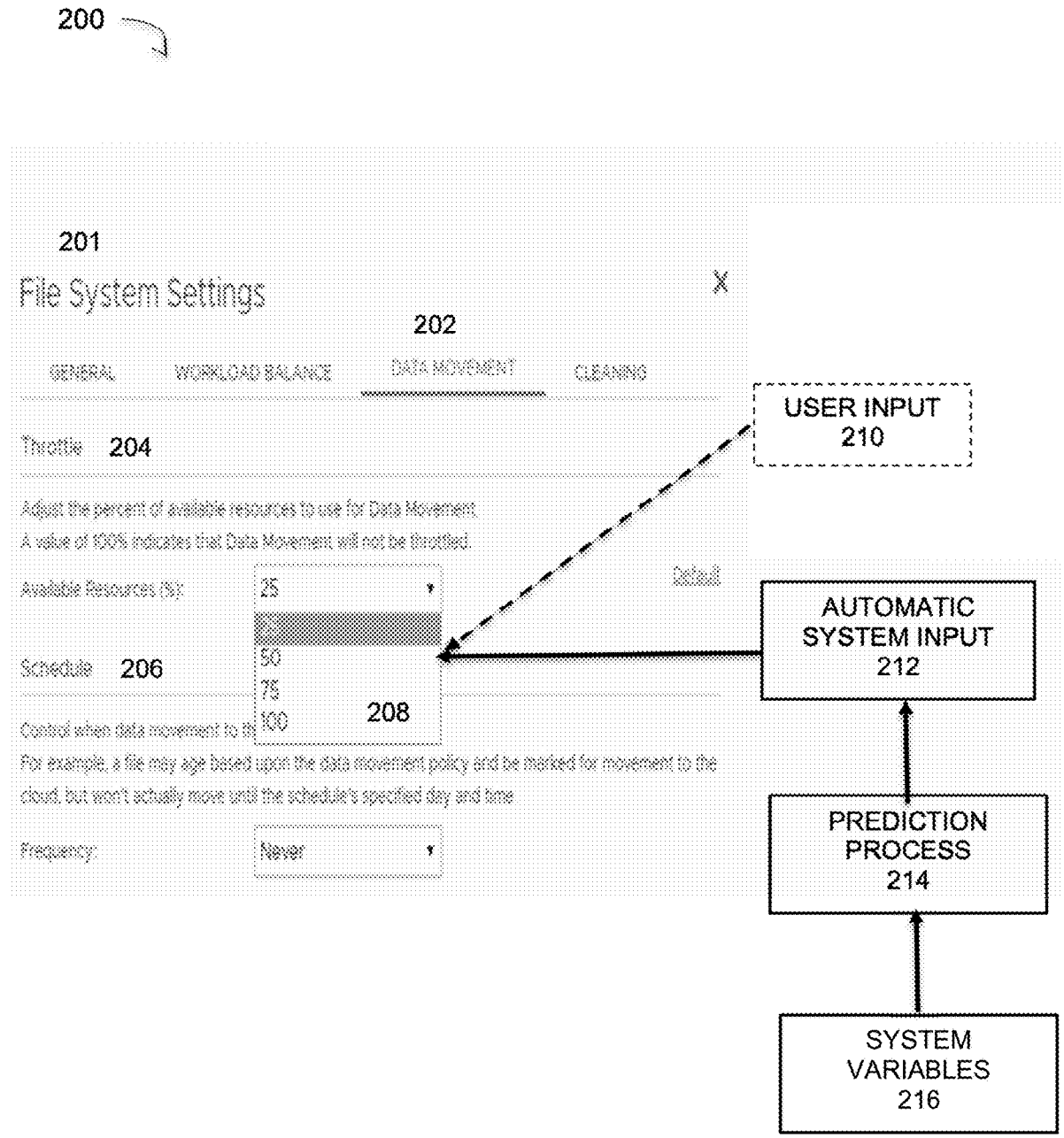
FIG. 2 illustrates the implementation of an automated, dynamic resource allocation process in place of present manual methods, under some embodiments.

One example of resource allocation is in a cloud data movement where data is moved to or from the cloud to a local computer. FIG. 2 illustrates the implementation of an automated, dynamic resource allocation process in place of present manual methods, under some embodiments. Diagram 200 of FIG. 2 illustrates a File System Settings screen 201 for an example data backup management console. The file systems setting include various system parameters, such as workload balance, data movement, cleaning, and other similar functions. The data movement settings 202 control various operational characteristics of data movement between data sources and storage media, such as between a local computer and the cloud. Data movement typically involves setting the data movement schedule 206, such as based on the age of a data set and/or regularly scheduled data move period. The data throttle setting 204 allows an adjustment of the percentage of available resources to use for data movement. For the example of cloud data movement, such resources can include CPU and network overhead (as shown in Table 1), while other applications may involve other system resources.

For the example of FIG. 2, the throttle percentage setting is displayed in a pop-up 208 that illustrates pre-defined and selectable percentages in a range of 0% to 100% in discrete steps, such as one-quarter steps, or any other appropriate granularity (e.g., ⅓, ¹/₁₀, etc.). Previous systems relied on user input 210 to set the throttle value 208 manually. As stated above, this requires the user to use experience in considering the future impact of a present throttle setting as under-throttling can affect data movement efficiency and over-throttling can affect other operations in the system. This is typically not easy, and requires great domain expertise and experience.

In an embodiment, the dynamic allocation process 120 provides automatic system input 212 to substitute for manual user input and set the resource allocation 208 to an optimum level based on a number of system variables 214 that are processed through one or more prediction processes 214. Although embodiments of the dynamic resource allocation process are shown with respect to data movement, similar methods may be applied to other applications or operations, such as filesystem cleaning (garbage collection), cloud data movement, and data replication. Other operations may also be included, and a specific present application undergoing a dynamic resource allocation may be referred to herein as a "desired operation," and may include any of the operations listed above, even though certain embodiments described below may be directed to a single example application, such as cloud data movement.

Embodiments of dynamic allocation process 120 provide for a-priori dynamic throttling based on multivariate time series forecasting of compute load. This not only automatically sets the throttle value according to the 'future' load, but also continuously maintains the accuracy using relative deviation and an adjustment map. It also avoids over-revision of throttle value by removing single point spikes.

Figure 3:
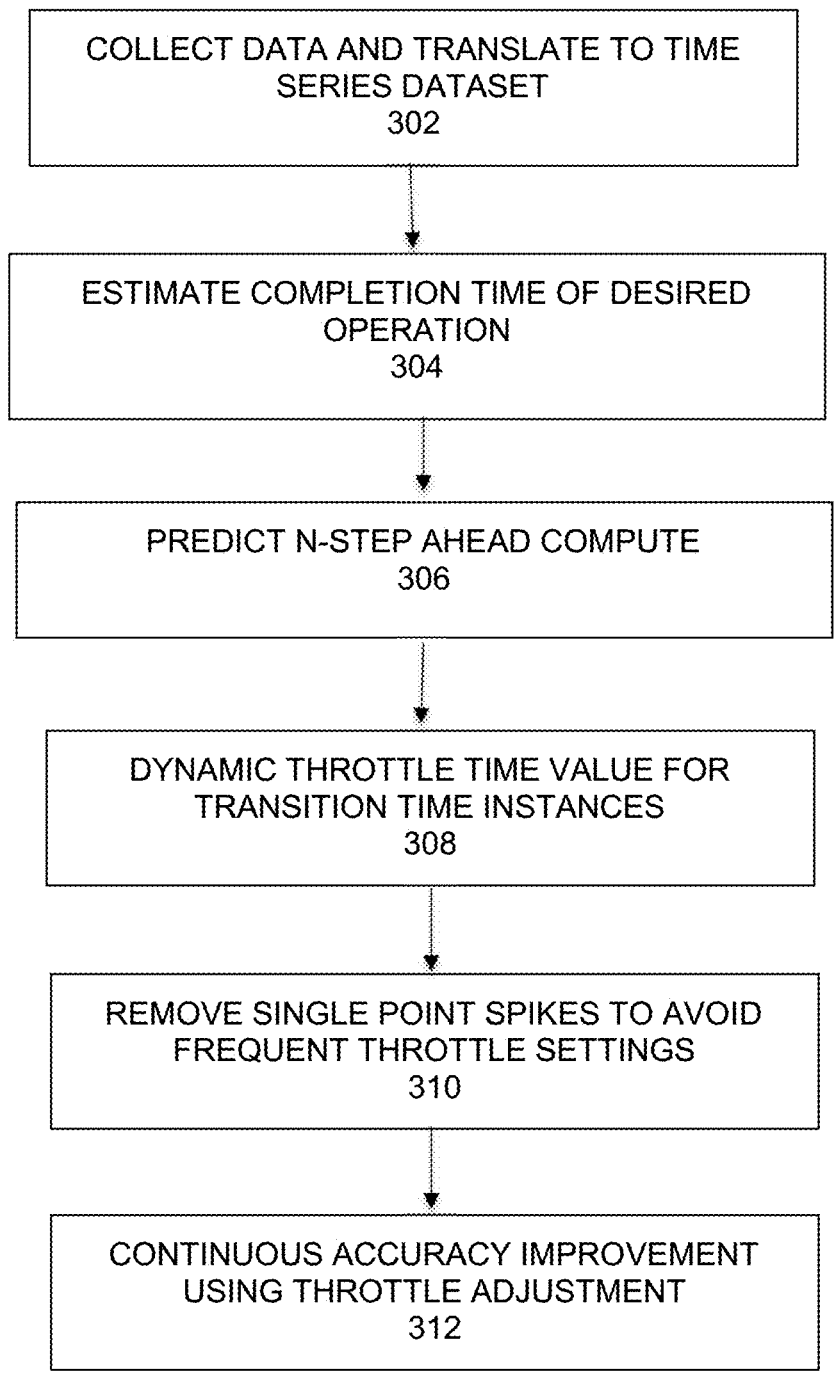
FIG. 3 is a flowchart that illustrates a method of dynamically allocating system resources through an automatic throttling process, under some embodiments.

FIG. 3 is a flowchart that illustrates a method of dynamically allocating system resources through an automatic throttling process, under some embodiments. Process 300 begins with a data collection step 302 in which usage data for the relevant resources are collected over a period of time. In an embodiment, a system activity report (sar), such as the Linux or Unix System V sar system monitor command is used to report on various system loads, including CPU activity, memory/paging, interrupts, device load, network and swap space utilization. Alternatively, other similar system activity reports can be used. In an embodiment, system 100 includes a statistics reporter 121, which may be provided as part of dynamic resource allocation process 120 executed by server 102 or any other component of system 100. The statistics reporter 121 is configured to monitor operations performed by storage system 100, including periodically (e.g., daily) collecting and transmitting operating statistics data to a remote device such as management system within process 120 or other network entity. The statistics reporter 121 can be configured to generate a system activity report and transform the sar data into any other appropriate data set.

Figure 4:
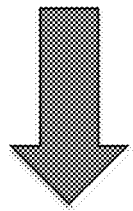
FIG. 4 illustrates an example system activity report used in the dynamic resource allocation process, under some embodiments.

FIG. 4 illustrates an example system activity report used in the dynamic resource allocation process 120, under some embodiments. As shown in diagram 400 of FIG. 4, a standard sar report 402 is generated showing load percentages for various system resources for certain defined epochs (time periods). The overall capture time and frequency of resource usage capture (epoch length) may be set by the user, system administrator, default value, or other appropriate means. In an embodiment, such as in a Data Domain system, the percentage resource allocation parameters extracted for use by the dynamic resource allocation process 120 include CPU Busy %, Disk IO %, Memory % and Network %. These data points are translated through a translation process 403 to a time series data set 404 for a single compute busy % parameter, for input to an n-step ahead forecast engine.

With reference to FIG. 3, after the data collection step, the process estimates the completion time of the desired operation (e.g., cloud data movement, replication, garbage collection, etc.), 304. In an embodiment, the prediction of the completion duration of desired operation on the backup storage system 100 can be obtained using random forest regression, or similar process. Aspects of a random forest regression processed as used in embodiments is described in further detail in U.S. Pat. No. 9,460,389, filed on May 31, 2013 and assigned to the assignees of the present application, and which is hereby referenced and incorporated in entirety.

In an embodiment, this step 304 uses a data collector that periodically collects operating statuses and desired operation statistics from one or more storage systems. The data collector stores the received operating statuses and statistics as features in a feature database, where the features may be extracted from the collected operating statuses and desired operation statistics. In one embodiment, a predictive model generator is configured to generate a predictive model to predict how long a desired operation takes to finish. In an embodiment, the predictive model generator determines a learning start date and learning window size (e.g., a learning or training period) for learning/generating a predictive model. In such an embodiment, the predictive model generator reads the features stored in the feature database that belong to the determined learning window and generates a learning feature table. Feature values from the learning feature table are used to generate a learning equation or algorithm. In one embodiment, a regression algorithm is applied to the learning equation to generate a predictive model. Depending on how accurate the predictive model is required to be, multiple learning equations may be generated using features from multiple storage systems for the same or different learning windows. In an embodiment, a desired operation is started on a storage system. A predictor reads the features corresponding to the desired operation from the feature database and generates a prediction feature table. The predictor uses the prediction feature table to generate a prediction equation. The predictor applies the generated predictive model to the prediction equation to predict a duration of the desired operation.

Figure 5:
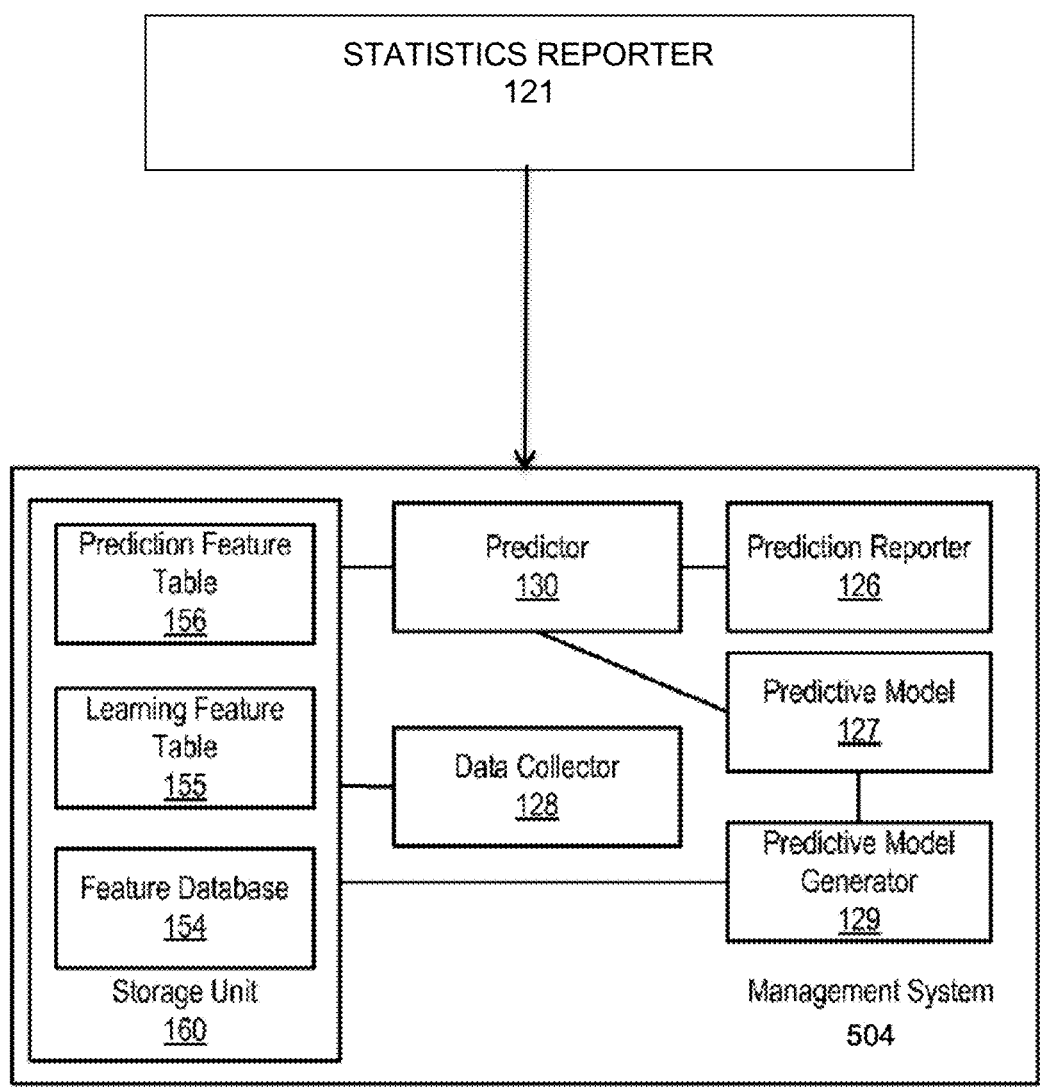
FIG. 5 illustrates a management system of the dynamic resource allocation component having a certain prediction sub-components, under some embodiments.

FIG. 5 illustrates a management system of the dynamic resource allocation component having a certain prediction sub-components, under some embodiments. In management system 504, data collector 128 is employed to communicate with statistics reporter 121 of system 100 to periodically collect statistic data concerning operating statuses of the desired operation.

As shown in FIG. 5, the collected statistic data is stored in storage unit 160 as part of feature database 154. Storage unit 160 is shown as part of management system 150 only for illustrative purposes, and embodiments are not so limited. The collected statistic data stored in feature database 154 may be statistic data collected from one or more storage systems. In one embodiment, the statistical data is collected from system 100 on a periodic basis corresponding to a specified epoch. In one embodiment, the collected statistic data stored in feature database 154 include CPU statistics, memory statistics, system capacity, compression factor, replication statistics, garbage collection statistics, disk status, as described above.

In one embodiment, predictive model generator (PMG) 129 is configured to process feature database 154 and learn predictive model 127 that is used to predict a total enumeration duration time of the desired process. In one embodiment, PMG 129 is configured to process feature database 154 and generate learning feature table 155 for a given learning start date and learning window. In one embodiment, multiple learning feature table 155 can be generated, each learning feature table 155 based on statistic data from a particular storage system stored in feature database 154. Each of learning feature table 155 is used to generate a respective learning equation. Each learning equation is fed to a regression algorithm (e.g., a random forest algorithm), to learn predictive model 127. The process is repeated multiple times, each time the learning start date is moved back in time. In other words, historical statistic data is used to generate predictive model 127. The number of learning equations that are generated and fed to the regression algorithm depends on system requirements such as how accurate must be the predictive model 127. The number of learning equations generated can also be limited by available system resources.

Feature database 154 includes statistic data which are collected from many storage systems deployed in the field. In an embodiment, certain enhancements, such as partitioning of statistical data in the feature database and noise removal from the feature database may also be used.

In one embodiment, predictor 130 is configured to process some or all of statistic data stored in feature database 154 to predict the total enumeration runtime of the desired process being performed in system 100. In one embodiment, predictor 130 reads statistic data from the respective storage system stored in feature database 154 and generates prediction feature table 156. Predictor 130 applies predictive model 127 to prediction feature table 156 to predict a duration of the desired process. In one embodiment, the model 127 is used to predict the total enumeration duration of the desired process being performed in the system. FIG. 5 illustrates one example of components and processes for estimating the completion time of the desired operation, and other or additional estimation or prediction components and processes may also be used.

In an embodiment, the estimated times for completion of the desired operation may be provided as a temporal measure (e.g., time in seconds, minutes, hours, etc.) based on specific parameters of the operation. Table 2 below illustrates example completion times for a data movement operation based on different amounts of data. For this example, the process works on a data movement operation to cloud and collects the time taken for every data-movement operation on the system, where the statistics are available in certain operation logs (e.g., DDFS logs).

TABLE 2

| DATA MOVEMENT | COMPLETION TIME |
| --- | --- |
| 1200 GiB | 43 mins |
| 870 GiB | 31 mins |
| 2680 GiB | 98 mins |

As shown in the example of Table 2 above, depending on the size of the data movement, the estimated completion time can range from under one hour to nearly two hours.

These statistics are provided for purposes of illustration only, and any other time durations for desired operations may be estimated.

In an embodiment, the estimated time dataset, such as provided in Table 2, can be used to train a model, such that any for any new data movement request for Mtrees or other data structures, the time taken for the completion of the data-movement operation can be predicted. Thus, if a particular operation, such as GC takes two hours to complete, the process estimates the load in the next two hours, and if it is too high for the relevant system resources (such as due to other processes), a throttle will be applied; otherwise if the system is idle over the next two hours, the throttle will be decreased or not applied at all.

With reference back to FIG. 3, once the estimated time of completion is performed (304), the process 300 computes an n-step ahead prediction, 306. In this step, the process uses the system information to collect historical data as a time series for each relevant resource (e.g., CPU, Memory, Disk IO and Network). For example, in the case of Data Domain, the historical data can comprise a sar report, IOstat, system performance, and the like, to gather the required information and store in a database. This provides a multivariate approach for probabilistic weighted fuzzy time series (PWFTS) that is used for forecasting compute resources. Unlike prior systems that rely on a single variable for resource prediction, embodiments use a multivariate time series based on parameters such as CPU idle percent, disk I/O, network bandwidth, and memory capacity, among others.

Figure 6:
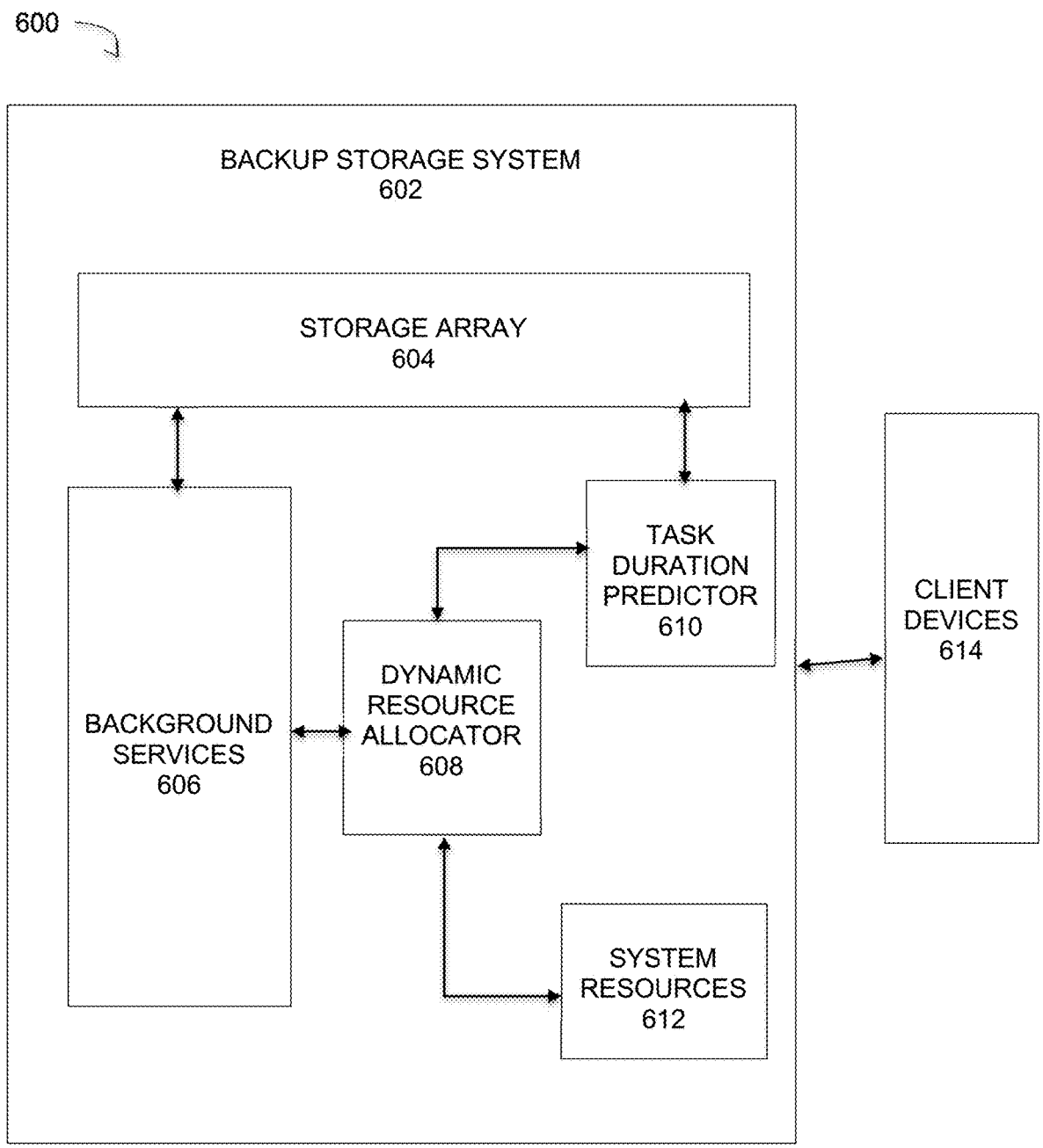
FIG. 6 is a block diagram of a system for generating a forecast z-series, ur some embodiments.

FIG. 6 is a block diagram of a system for generating a forecast time-series, under some embodiments. As shown in system 600, a backup storage system 602 includes a storage array 604 (e.g., RAID, VM, or other storage media) and one or more background services 606 that may be designed and configured to perform one or more tasks or operations in the background of the backup storage system. That is, a background service may perform one or more operations, which is unnoticeable to a backup storage system user and/or administrator and, subsequently, require little or no user interaction. Operations, performed by a background service 606, may be carried out based on a prescribed task schedule or on-demand, and may be configured and/or controlled (e.g., started, paused, resumed, or stopped) by way of other computer programs executing on the background storage system 602 such as, for example, an operating system (OS) (not shown) or a background service manager (not shown). Examples of a background service may include, but are not limited to, a garbage collection service, a data migration (i.e., to a cloud computing environment) service, a data replication (i.e., between physical storage devices of storage array 604) service, an update download service, and so on.

In an embodiment, a task duration predictor 610 may refer to a computer program that may execute on the underlying hardware of the backup storage system 602. Specifically, the task duration predictor 610 may be designed and configured to predict a duration (or length of time) that may be consumed, by a background service 606, to complete a desired operation. To that extent, the task duration predictor 610 may perform any subset or all of the flowchart steps outlined in FIG. 8 below. Further, the prediction of any background service task duration may entail generating and applying a random forest regression based predictive model using sets of features (i.e., individual, measurable properties or variables significant to the performance and length of time consumed to complete a given background service task).

In one embodiment, a system resource or resources 612 may refer to any physical or virtual component of limited availability within e backup storage system 602. For example, a system resource 612 may include, but is not limited to, a compute resource, i.e., a measurable quantity of a compute-relevant resource type that can be requested, allocated, and consumed. More specifically, a compute resource may pertain to a physical device (i.e., hardware), a logical intelligence (i.e., software), or a combination thereof, which may provide computing and/or processing functionality on the backup storage system 602. Central processing units (CPU), graphics processing units (GPU), and/or memory (e.g., random access memory (RAM)) may exemplify compute resources residing on the backup storage system 602. System resources 612 may not be limited to compute resources and/or the aforementioned examples of compute resources. For example, system resources they may further include, but are not limited to, storage resources (e.g., physical storage device capacity), virtualization resources (e.g., VMs).

In an embodiment, a dynamic resource allocator 608 may refer to a computer program that may execute on the underlying hardware of the backup storage system 602. Specifically, the dynamic resource allocator 608 may be designed and configured to allocate one or more system resources 612, dynamically throughout the predicted duration of a given background service task, to a given background service 606 responsible for performing the given background service task. To that extent, the dynamic resource allocator 608 may perform any subset or all of the flowchart steps outlined in FIGS. 7-9 below. Further, allocation of system resources 612 may be regulated based on a projected availability of the system resources throughout the predicted duration of the given background service task, which is described in further detail below.

In an embodiment, a client device 614 may represent any physical appliance or computing system designed and configured to receive, generate, process, store, and/or transmit data, as well as to provide an environment in which one or more computer programs may execute thereon. The computer programs may, for example, implement large-scale and complex data processing; or implement one or more services offered locally or over a network. Further, in providing an execution environment for any computer programs installed thereon, a client device 614 may include and allocate various resources (e.g., computer processors, memory, storage, virtualization, network bandwidth, etc.), as needed, to the computer programs and the tasks (or processes) instantiated thereby, One of ordinary skill will appreciate that a client device 614 may perform other functionalities. Examples of a client device 614 may include, but are not limited to, a desktop computer, a laptop computer, a tablet computer, a server, a mainframe, or any other computing system.

Figure 7:
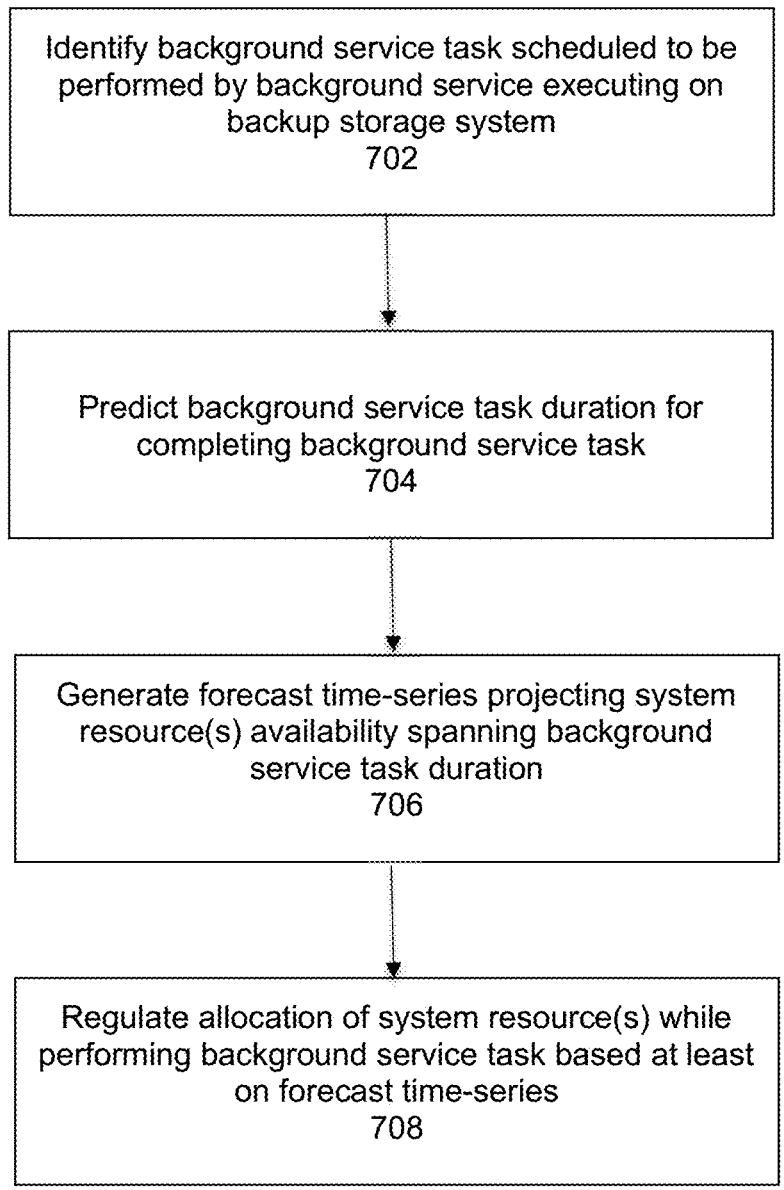
FIG. 7 is a flowchart illustrating a method for intelligently provisioning resources in support of background service tasks under some embodiments.

FIG. 7 is a flowchart illustrating a method for intelligently provisioning resources in support of background service tasks under some embodiments. The various steps outlined below may be performed by the dynamic resource allocator residing on the backup storage system. Further, while the various steps in the flowchart are presented and described sequentially, one of ordinary skill will appreciate that some or all steps may be executed in different orders, may be combined or omitted, and some or all steps may be executed in parallel.

Turning to FIG. 7, in step 700, a background service task is identified. In one embodiment, the background service task may represent a yet-to-be perforated (i.e., scheduled or on-demand) operation that is to be carried out by an appropriate background service executing on the backup storage system. Examples of the background service task may include, but are not limited to, a garbage collection operation, a data migration operation, a data replication operation, and an update download operation.

In step 702, a background service task duration is predicted. In one embodiment, the background service task duration may refer to a length or amount of time required for the background service task (identified in step 700) to be completed (i.e., time to completion) Prediction of the background service task duration is described in further detail below with respect to FIG. 8.

In step 704, a forecast time-series is generated. In one embodiment, the forecast time-series may represent a series of values indexed in a specified future time order, which spans the background service task duration (predicted in step 702). Further, each value nay capture an amount or percentage of backup storage system resources projected to be available at a corresponding future point of time. In one embodiment, when multiple backup storage system resource types are considered, a forecast time-series may be generated for each backup storage system resource type that may be considered. Generation of the forecast time-series is described in further detail below with respect to FIG. 9.

In step 706, an allocation of backup storage system resources is regulated throttled) based at least on the forecast time-series (generated in step 704). That is, in one embodiment, while the background service task (identified in step 700) executes, backup storage system resources may be dynamically allocated, in accordance and proportional to the availability of backup storage system resources projected by the forecast time-series, towards supporting the execution of the background service task. Throttling of backup storage system resources allocation is described in further detail below.

Figure 8:
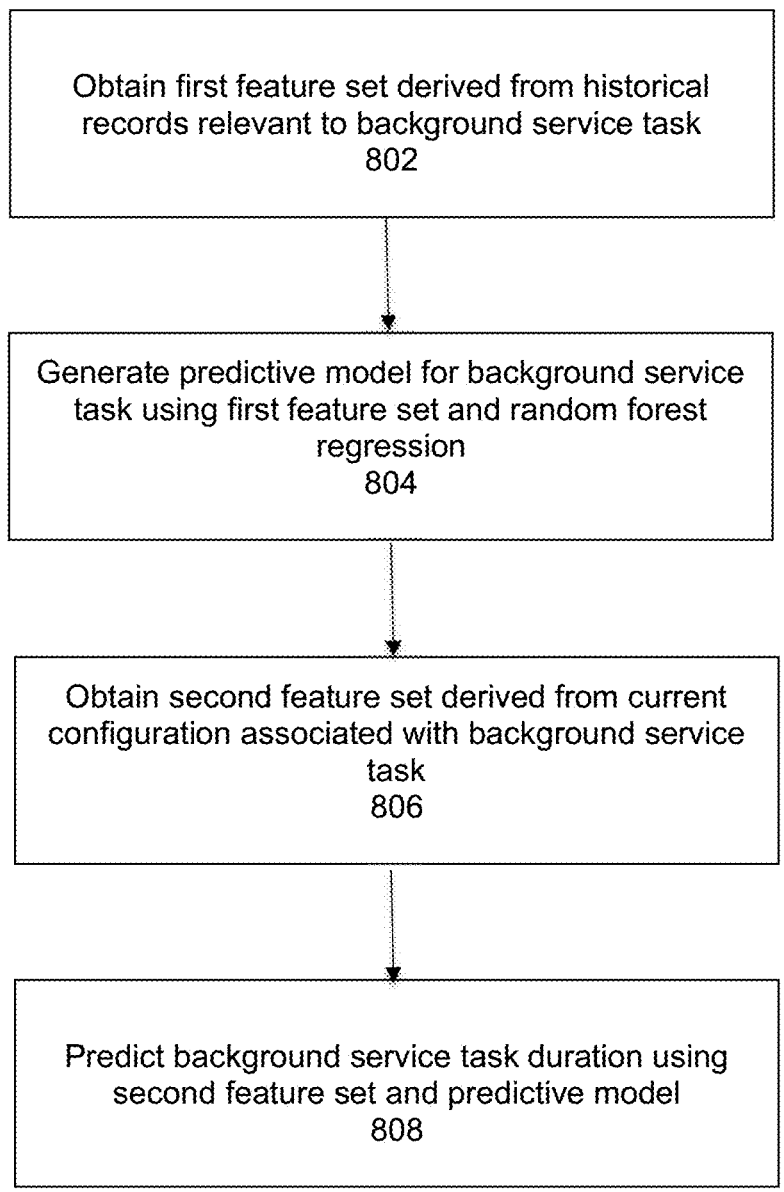
FIG. 8 is a flowchart illustrating a mea d for predicting a background service task duration under some embodiments.

FIG. 8 is a flowchart illustrating a method for predicting a background service task duration under some embodiments. The various steps outlined below may be performed by the task duration predictor residing on the backup storage system 602. Further, while the various steps in the flowchart are presented and described sequentially, one of ordinary skill will appreciate that some or all steps may be executed in different orders, may be combined or omitted, and some or all steps may be executed in parallel. Turning to FIG. 8, in step 802, one or more first feature sets is/are obtained. In one embodiment, a feature set may refer to a collection (e.g., array or vector) of values, each representative of a different feature pertinent to the performance of any given background service task (e.g., as illustrated in FIG. 7) for a given point of time. A feature, in turn, may represent an individual measurable property or attribute reflective of the configuration and/or operating state of the backup storage system. The value at a given point of time, for each feature, may be collected periodically (or on-demand) by one or more physical and/or logical sensors integrated throughout the backup storage system.

In one embodiment, the aggregation of these values for any given feature, spanning multiple sampling points, may be referred herein as statistical data. By way of examples, these statistical data may include, but are not limited to, measurements or metrics relevant to backup storage system resource (e.g., compute, storage, virtualization, network, etc.) availability and utilization, measurements or metrics relevant to the input, execution, and output of a given background service task (e.g. garbage collection, data migration, data replication, update download, etc.), information describing the general configuration of the backup storage system, information describing the configuration of a given background service task, etc. Furthermore, the first feature set(s) may be derived from maintained histories (i.e., historical records) of statistical data.

In step 804, a predictive model for the background service task is generated. In one embodiment, the predictive model may refer to an optimized statistical and/or machine learning model directed to forecasting outcomes (e.g., background service task durations) given a set of predictors (e.g., a feature set). Further, generation of the predictive model may entail an iterative learning (i.e., training and/or validation) process involving the first feature set(s) (obtained in step 802) in conjunction with a known forecasting algorithm such as, for example, a random forest regression algorithm. Random forest regression refers to an ensemble technique, which constructs multiple decision trees that are each trained using a different data sample (e.g., a different first feature set) and applies bootstrap aggregation (or baggging), to produce a mean prediction (e.g., a mean prediction of a background service task duration) of the individual decision trees. Details outlining the implementation of random forest regression to predict, for example, times to completion of garbage collection operations may be disclosed in the above-referenced '389 Patent.

In step 806, a second feature set is obtained. In one embodiment, whereas the first feature set(s) (obtained in step 802) may be derived from historical (or past) values representative of a collection of features, the second feature set may be derived from more recent or current, observed values of the collection of features. Accordingly, each first feature set may represent a separate training data set for optimizing the predictive model (generated in step 804), while the second feature set may represent the testing data set through which a prediction may be produced.

In step 808, a background service task duration is predicted. In one embodiment, the background service task duration may refer to a length or amount of time required for the background service task to be completed (i.e., time to completion). Further, prediction of the background service task duration may entail processing the second feature set (obtained in step 806) using the predictive model (generated in step 804).

Figure 9:
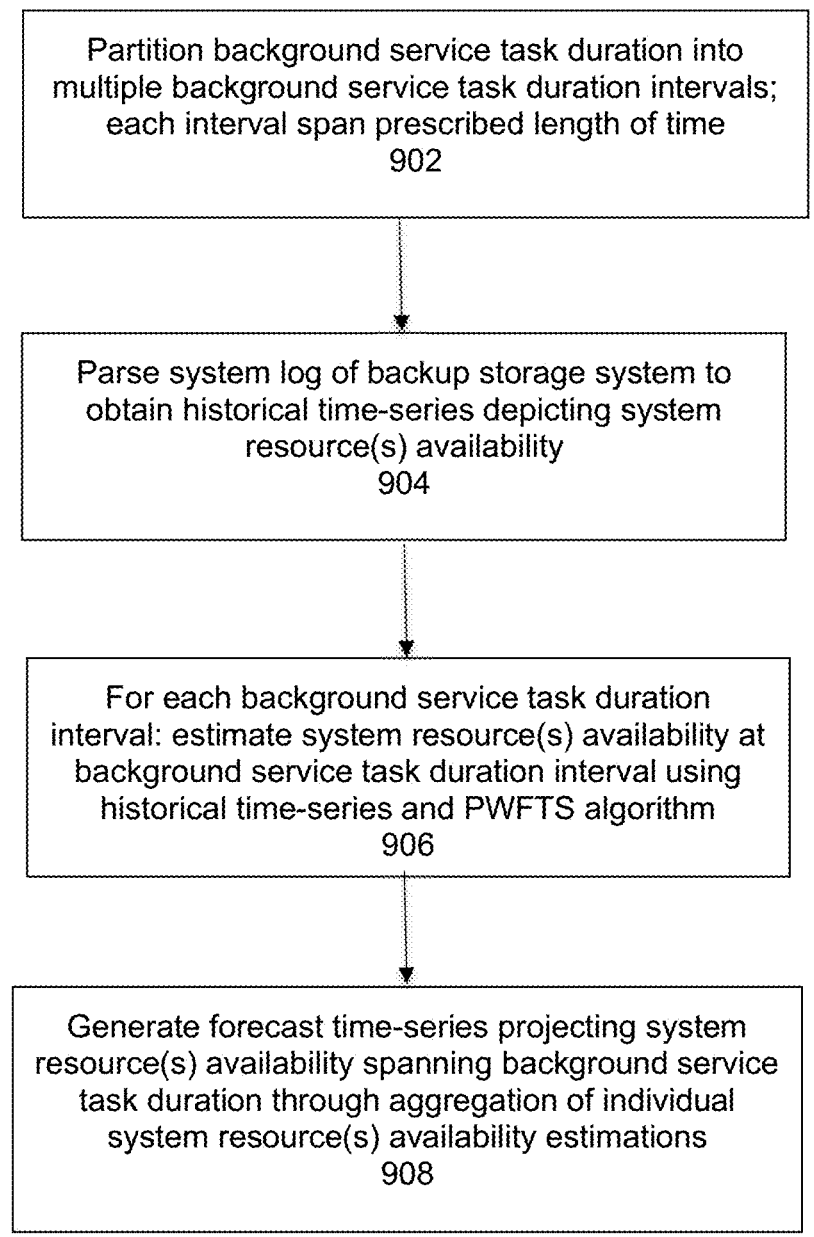
FIG. 9 is a flowchart illustrating a method for generating a forecast time-series under some embodiments.

FIG. 9 is a flowchart illustrating a method for generating a forecast time-series under some embodiments. The various steps outlined below may be performed by the dynamic resource allocator residing on the backup storage system 602. Turning to FIG. 9, in step 902, a background service task duration (described above—see e.g., FIG. 7) is partitioned. Specifically, in one embodiment, the background service task duration may be segmented into multiple background service task duration intervals. Each background service task duration interval may span a length of time (e.g., five minutes, ten minutes, thirty minutes, one hour, etc.) prescribed by a backup storage system administrator, or consistent with a periodicity in which statistical data (see e.g., FIG. 8) may be collected on the backup storage system.

In step 904, a system log of the backup storage system is parsed. In one embodiment, the system log may represent a data object (e.g., a file, a table, a structure of arrays, a composite variable, etc.) that chronologically documents or records the utilization of backup storage system resources at prescribed sampling intervals. That is, the system log may maintain a point-in-time utilization history of one or more backup storage system resource types (e.g., compute resources, storage resources, virtualization resources, network resources, etc.). Further, the point-in-time utilization history of each backup storage system resource type may be broken down into various categories or features, e.g., a percentage of the resource type consumed for user-pertinent operations (e.g., data backup operations, data restore operations, data deduplication operations, etc.), a percentage of the resource type consumed for system-pertinent operations (e.g., background service tasks, etc.), a percentage of the resource type not utilized or idled, and so on.

In one embodiment, in parsing the system log, a historical time-series may be obtained. The historical time-series may represent a series of values indexed in a specified past time order, which may span any given length of the point-in-time utilization history captured in the system log. Further, each value may depict an amount or percentage of backup storage system resources recorded to have been available at a corresponding past point of time. The recorded availability of backup storage system resources may be derived from the idle (i.e., not utilized) percentage history of a selected resource type. Alternatively, when multiple resource types are considered, a historical time-series may be obtained, through parsing of the system log, for each resource type that may be considered.

In step 906, for each background service task duration interval (defined in step 902), a future availability of backup storage system resources is estimated. That is, in one embodiment, an available (or idle) amount or percentage of a selected resource type may be projected for each background service task duration interval. Further, each projected value available amount or percentage of the elected resource type) may be estimated based on the historical time-series (obtained in step 904) in conjunction with a known forecasting algorithm such as, for example, a probabilistic weighted fuzzy time-series (PWFTS) algorithm. PWFTS is a probabilistic forecasting algorithm, which considers fuzzy and stochastic patterns on data (e.g., the historical time-series), to produce prediction intervals (or probability distributions). The implementation of the PWFTS algorithm may be performed in accordance to presently known methods.

In step 908, a forecast time-series is generated from the future availability of backup storage system resources for each background service task duration interval (estimated in step 906). In one embodiment, the forecast time-series may represent a series of values indexed in a specified der, which spa s the background service task duration (pa step 904). Further, each value may capture an amount or percentage of backup storage system resources projected to be available at a corresponding future point of time. When multiple backup storage system resource types are considered, a forecast time-series may be generated for each backup storage system resource type be considered.

FIG. 10A illustrates an example of a multivariate time series generated using the PWFTS method under some embodiments. Table 1050 of FIG. 10A shows the system performance as a multivariate time series that is generated through information that can be collected using system reports, such as sar report and IOstat, as examples.

FIG. 10B illustrates an example of an n-step ahead forecast under some embodiments. Table 1060 of FIG. 10B shows predicted values (n-step ahead) for compute busy (%) using PWFTS.

Figure 11A:
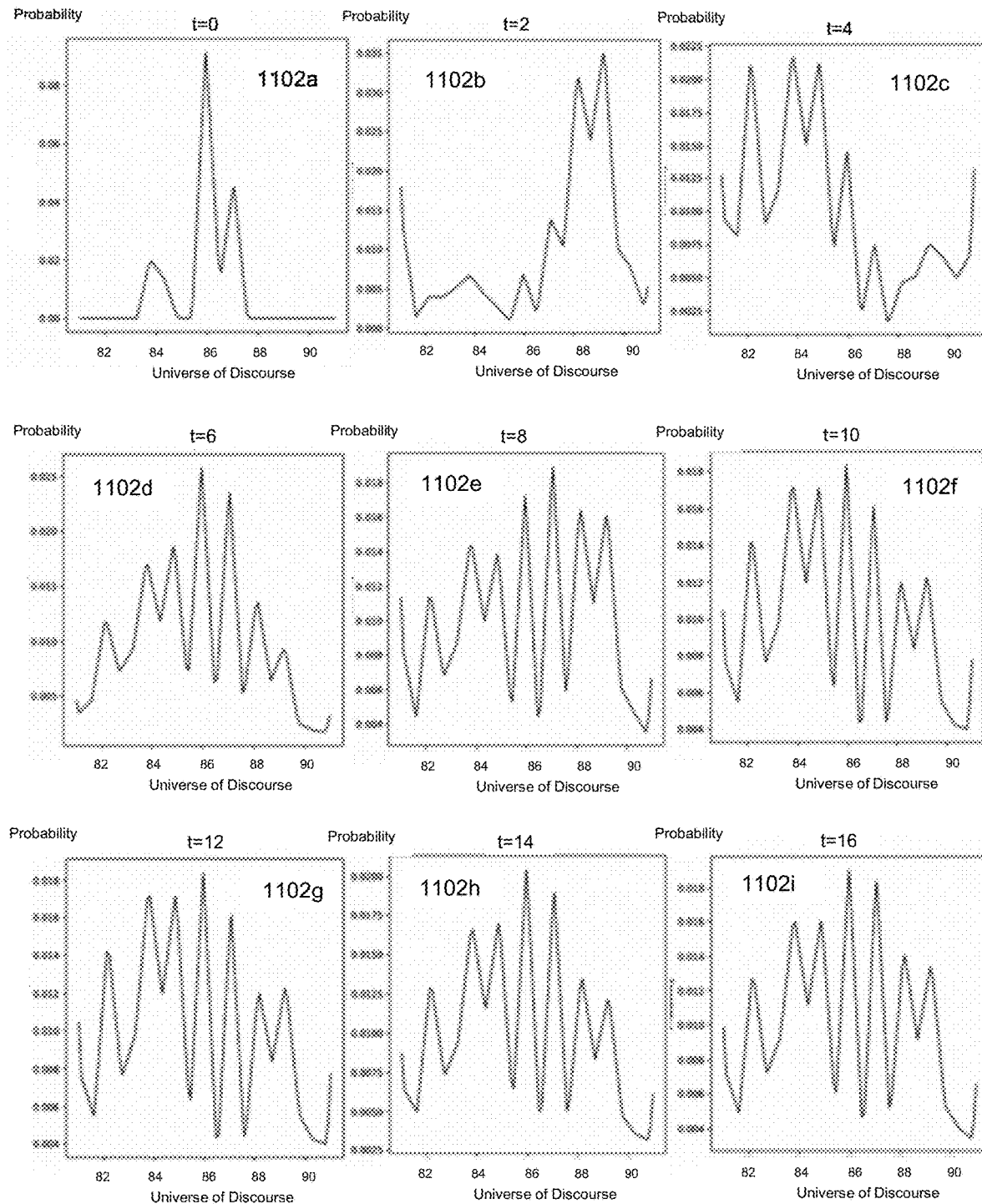
FIG. 11A illustrates a first part of a set of multivariate PWFTS plots for n-step ahead forecasting under some embodiments.
Figure 11B:
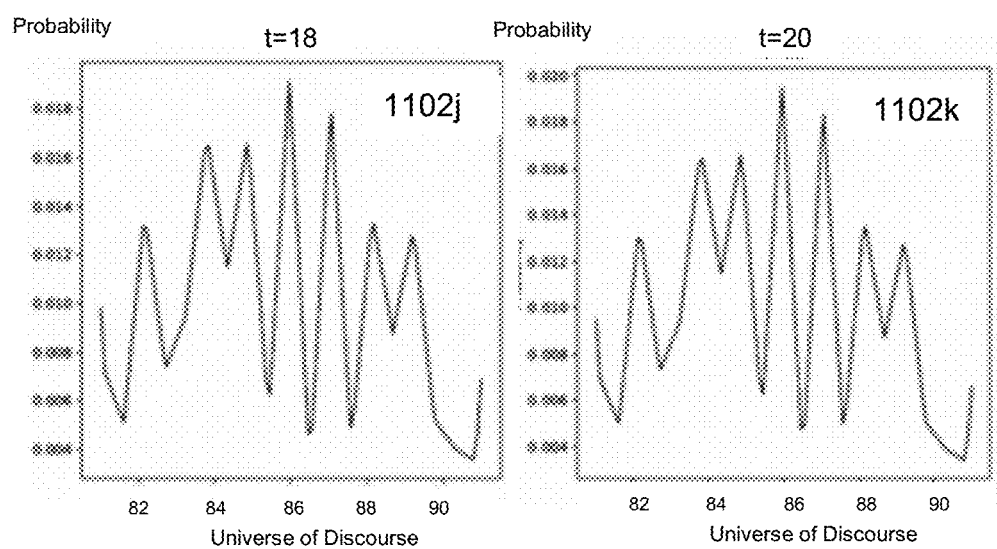
FIG. 11B illustrates a second part of a set of multivariate PWFTS plots for n-step ahead forecasting under some embodiments.

FIGS. 11A and 11B illustrate a set of multivariate PWFTS plots for n-step ahead forecasting under some embodiments. The plots 1102a through 1102k of FIGS. 11A and 11B illustrate a universe of discourse for times t=2, 4, 6, 8, . . . , 20. In these plots, the probability (y-axis) is mapped against the universe of discourse as prediction values ranging from 80 to 100. The plots illustrate the probability distribution of predicted values. The progression of the plots illustrates how the n-step ahead prediction can be used to make a decision of how much to throttle a resource. For example, at t=0 (first prediction interval) plot 1102a, there is a universe of discourse range between 82 to 90 and the relevant probability of prediction is shown along the y-axis. For this plot, the maximum probability of prediction value is 86. So, the prediction value is chosen as 86. For the second prediction interval, t=2 (plot 1102b), maximum probability of prediction value is 89.5, and so on.

Dynamic Throttling for Transition Time Instances

As stated above, most present systems allow the throttle value to be fixed manually. Once fixed, it may be counterproductive if the resource utilization changes considerably and the throttle value is not updated based on these changes. For example, the system may throttled when the load was heavy in order to allow resources to be available for other processes and applications. Later, the utilization may come down, but the fixed throttle value is not updated. In this case, the system is running with lesser resources even though they are available. Similarly, when the system is not throttled, or throttled with a lower value, then during a rise in resource demand, some processes or applications may choke up the system.

Even if some systems implement automatic changes in throttle based on load level change, they do so in real time. This has two disadvantages, first, it requires continuous monitoring of the resource utilization, and second, it may end up doing too many throttle changes if the utilization is very spiky around the change level. Embodiments of the dynamic resource allocation process help to automate the throttling while also addressing these challenges.

In an embodiment, the dynamic resource allocation process uses the PWFTS prediction of resource utilization to know beforehand at which time instances the resource usage may change considerably. For this, the process defines a defined number of usage levels (e.g., three) based on which the throttle change decision will be made. In an embodiment, three levels are used and are denoted as Low, Medium and High. Equation 1 defines the usage levels in this example case as:

$$K=: \{k: k \in 1,2,3\} \text{ respectively} \qquad \text{Eqn. 1}$$

Many more levels may be defined depending on desired granularity and their boundaries may be altered. For the example case of three levels, the mapping for K and the default throttle $Th_K$ for that K against the resource utilization is given in the example default throttle mapping table (Table 3) as follows:

TABLE 3

| Usage Level | Resource Utilization % | K | Default Throttle value to set ($Th_K$) |
|---|---|---|---|
| Low | 0%-30% | 1 | 0% |
| Medium | 30%-60% | 2 | 30% |
| High | 60%-100% | 3 | 60% |

Suppose the forecasting is made from $t_0$ onwards with a step δ in time and i denotes every next instance. Hence, the set of time instances for which the prediction is made is given in Equation 2 as follows:

$$T=\{t_i: i \in W\} \qquad \text{Eqn. 2}$$

From the prediction, the process obtains the transition points along with their transitioned level referring to the points where resource utilization moves from one usage level to the other. This transition of level is shown in Equation 3 as follows:

$$k \to k_{new} | k_{new} \in \{K-k\} \quad \text{Eqn. 3}$$

In the above equation, the transition set comprising of time of change and the transitioned level is given in Equation 4 as follows:

$$T_{tm} = \{(t_{tm}, k_{tm}): t_{tm} = t_i | t_i \in T \forall t_{i-1}^k \to t_i^{k_{new}}, k_{tm} = k_{new}\} \quad \text{Eqn. 4}$$

At these transition time instances, the throttle value is changed to the default throttle corresponding to final usage level to which transition has occurred. Once done, it is not necessary to measure the resource utilization at every point, which was the first problem in autonomous throttle setting.

In many autonomous correction methods, one challenge is to avoid single point spike conditions to avoid over-frequent adjustments. To address the problem of avoiding frequent changes at the juncture of usage levels at points where the graph is spiky, embodiments of the process drop single point spikes from the transition set. Hence, the final transition set is given in Equation 5 as:

$$T_{tm} = \{(t_{tm}, k_{tm}) : t_{tm} \neq t_i | t_i \in T_{tm} \forall t_{i-1}^k = t_{i+1}^k, k_{tm} = k_{new}\} \quad \text{Eqn. 5}$$

Figure 12:
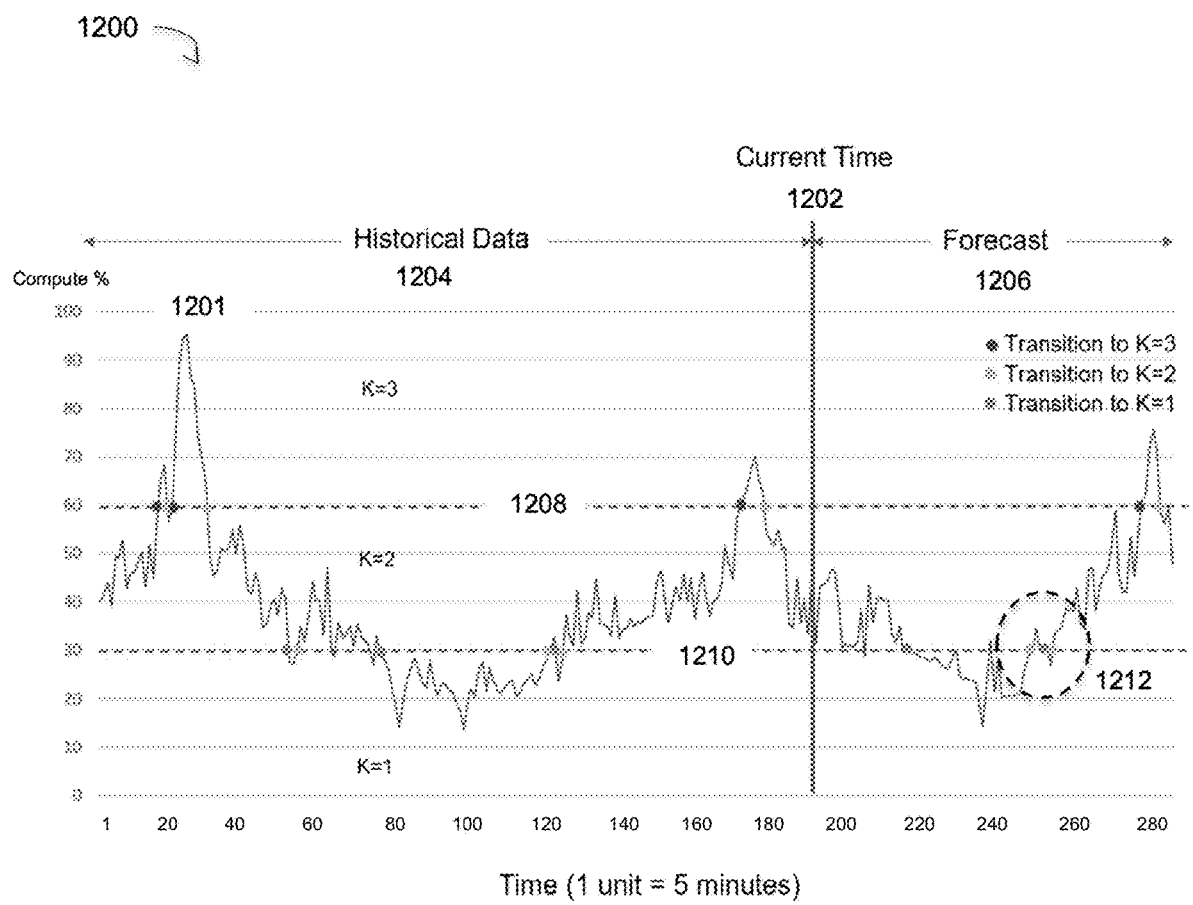
FIG. 12 illustrates historical and n-step ahead compute points versus time in an example embodiment.

These points are shown in graph 1200 of FIG. 12. FIG. 12 illustrates historical and n-step ahead compute points versus time in an example embodiment. FIG. 12 illustrates a plot of compute percentage (0 to 100%) over units of time. A current time axis 1202 separates historical data 1204 from forecasted data 1206. Another set of axes 1208 and 1210 divide the plot into three usage level regions K=1 (low usage), K=2 (medium usage), and K=3 (high usage). Each crossing of the compute percent plot 1201 across axis 1208 or 1210 indicates a transition to a different usage level, as shown by the intersection dots in FIG. 12. In an embodiment, the transition points on the horizontal axes 1208 and 1210 in the forecast data region 1206 prompt the application or release of the throttle according to whether the compute percentage plot 1201 is going to a higher usage level from a lower usage level, or to a lower usage level from a higher usage level. The relative positions of the 1208 and 1210 axes, and the sizes of the usage level regions, K, can be set as desired. For the example shown the 1210 axis is set at 30% usage and the 1208 axis is set at 60% axis, but embodiments are not so limited, and any appropriate percentage levels can be set for these axes.

As shown in FIG. 12, a highlighted circled area 1212 indicates a single point spike condition in which a transition between from a first usage level to a second usage level (e.g., K=1 to K=2) is quickly followed by a transition back from the second usage level to the first usage level (i.e., K=2 to K=1) without any other spikes within a certain distance of that transition, such that the quick up and back transition exists alone and not as a general trend to a different usage level. In this case, applying and/or releasing the throttle in quick succession may impose a greater burden on the system than not throttling at all. Embodiments detect the condition of a single point spike and do not apply the throttle in this case, even if transitions between usage levels are forecasted, such as shown in region 1212. The short time duration between successive opposite transitions and the amount of time isolating the resulting spike can be defined depending on system configuration and requirements. The tolerance to the system in throttling in the case of quick up and down movements of plot 1201 can thus be tailored with respect to how the throttle is triggered as some systems or circumstances may be more tolerant of frequent throttling, while other may not.

In an embodiment, the dynamic resource allocation process 120 provides a continuous accuracy improvement of the system using the throttle adjustment mechanism. The method gives the best results when the prediction of resource utilization is accurate. As the training size increases, the forecasting algorithm gives results closer to reality. However, in case of a smaller training set, or workload change in the system, the prediction may show some considerable deviation from actual utilization. In such a case, it is important to dynamically alter the throttle value to avoid over or under throttling. This can be done by a continuous throttle adjustment mechanism in which the system makes real time observations ($R_a$) after every time step j such that j={ni: n∈N-1} where n is the monitoring frequency factor. Note here that n should be greater than 1 to avoid annulling the prediction benefits and instead making too many measurements. The actual measure at time instance t=$t_i$ is denoted with $R_a^{t_i}$ and the predicted value for the same time instance as $R_p^{t_i}$. The deviation Δ between the actual resource utilization $R_a$ and the predicted value $R_p$ is monitored after every nδ time units and is compared with a predefined tolerance ε which denotes the relative deviation that can be tolerated. In case, the relative deviation increases beyond ε in magnitude. A change $\Delta_{Th}$ is made in the present throttle value according to the Throttle Adjustment Mapping Table (Table 3).

TABLE 3

| Present Throttle Value (Th) | Change in Throttle Value ($\Delta_{Th}$) |
| --- | --- |
| 0%-30% | 10% |
| 30%-70% | 05% |
| 70%-90% | 02% |
| 90%-99% | 01% |

Below is pseudocode of a computer program for the complete adaptive throttling mechanism with continuous adjustment, under an example embodiment.

```
INPUT: n - step ahead time series data
OUTPUT: adaptive throttle (Th)
initially: i = 0, Set throttle value corresponding to K at t₀
    Th = Th_K at t_i _ 0 where Th_K = Th: t_i _ 0 → K
Set i = 1, j = ni
while i > 0
if ti = t_tm, then
    Th = Th_K where Th_K = Th: t_i → K → Th
else
    continue
if i = j ,then Calculate relative deviation Δ^t_j = (R_a^{t_j} - R_p^{t_j}) / R_a^{t_j} if Δ^t_j > ε, then
        Th = Th_K + Δ_Th
    else if Δ^t_j < - ε, then
        Th = Th_K - Δ_Th
    j = j + n
else
    continue
i = i + i
```

Figure 13:
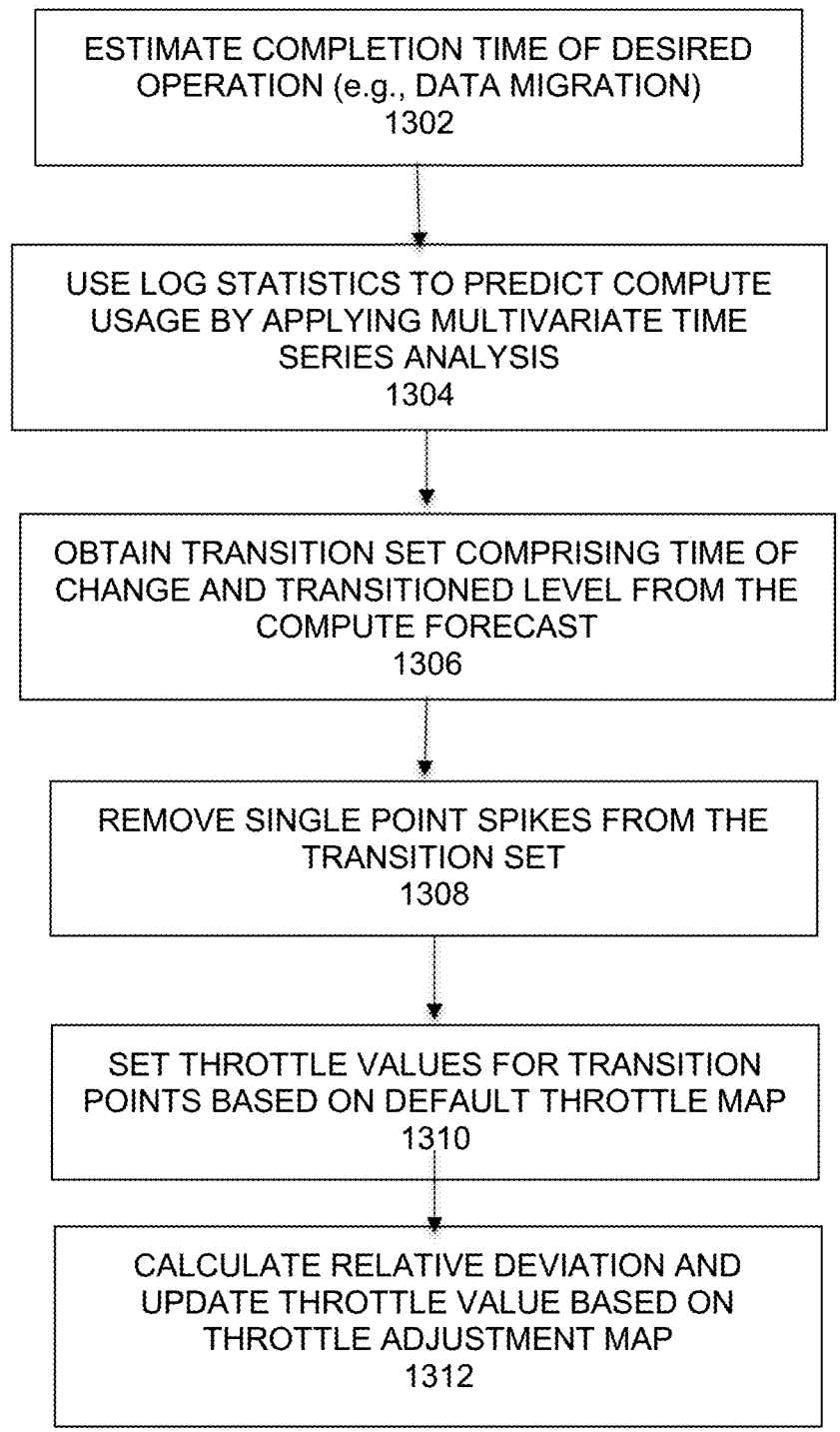
FIG. 13 is a flowchart that illustrates a method of dynamically allocating system resources under some embodiments.

FIG. 13 is a flowchart that illustrates a method of dynamically allocating system resources under some embodiments. In step 1302, the process estimates the completion time of a desired operation. It then uses log statistics to predict compute usage by applying multivariate time-series analysis, where the multiple variables comprise system parameters such as CPU usage, disk I/O, network bandwidth and memory utilization, step 1304. From this compute prediction or forecast, the process obtains a transition set comprising time of changes and transitioned levels, such as shown in FIG. 12, step 1306. The transition points are analyzed to identify single point spike conditions, and these single point spikes are removed from the transition set, so as not to cause throttling, step 1308. In step 1310, the process sets throttle values for the transition points based on a default throttle map, such as shown in Table 2 above. It then calculates a relative deviation and updates throttle values based on a throttle adjustment map, such as shown in Table 3 above.

The method illustrated in FIG. 13 provides an autonomous dynamic resource setting that is based on forecasted a-priori CPU resource utilization, rather than a manual throttle setting. A multivariate (CPU idle %, disk I/O, network and memory) rather than single variable approach for Probabilistic Weighted Fuzzy Time Series (PWFTS) is used for forecasting compute resource. The dynamic throttling is combined with an adaptive compute change rate detection and correction. A single spike detection and removal mechanism is used to prevent the application of too many frequent throttling changes. Such a method can be implemented for autonomous and dynamic resource allocation in storage systems for several use cases including, but not limited to: cloud data migration, replication to a storage server, system upgrades, bandwidth throttling in storage networks, and garbage collection.

System Implementation

Embodiments of the processes and techniques described above can be implemented on any appropriate backup system operating environment or file system, or network server system. Such embodiments may include other or alternative data structures or definitions as needed or appropriate.

Figure 14:
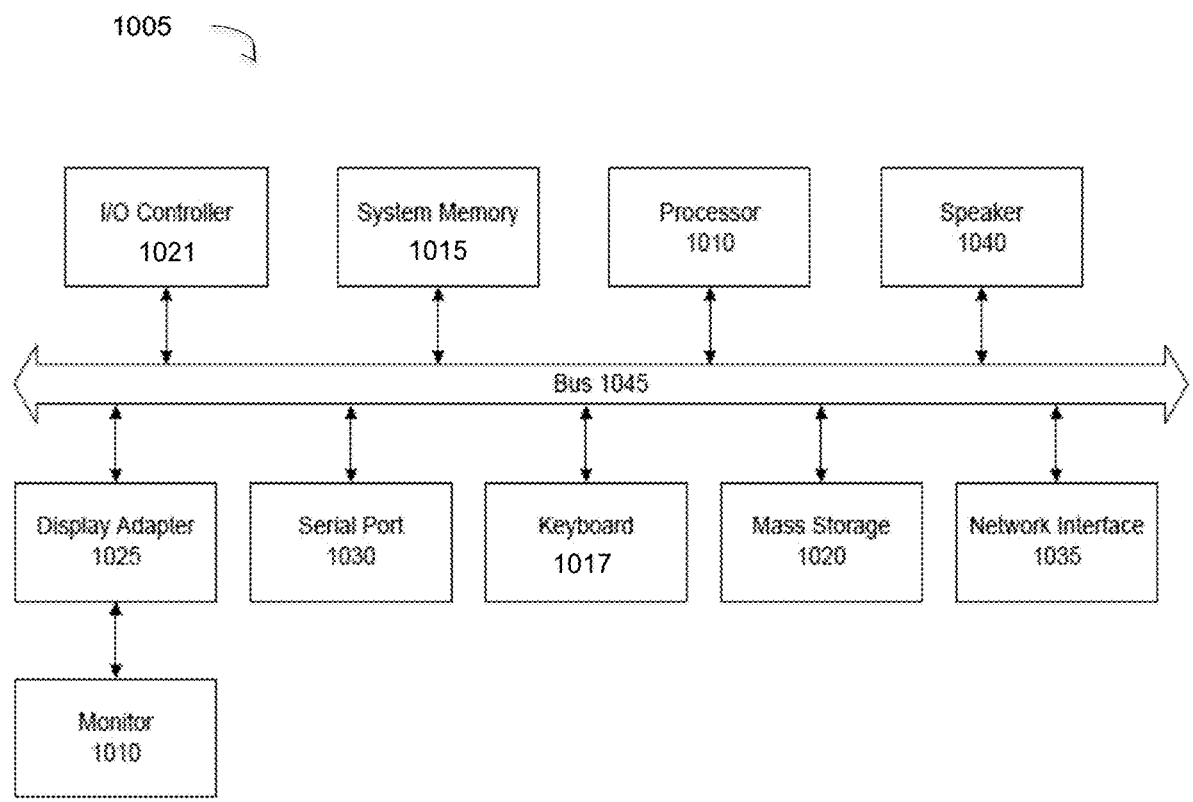
FIG. 14 is a system block diagram of a computer system used to execute one or more software components of the network of FIG. 1, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 14 shows a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system).

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 is just one example of a computer system suitable for use with the present system. Other configurations of subsystems suitable for use with embodiments will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®. family of systems (e.g., Windows Server), Linux, Mac OS X, IRIX32, or IRIX64. Other operating systems may be used.

For the sake of clarity, the processes and methods herein have been illustrated with a specific flow, but it should be understood that other sequences may be possible and that some may be performed in parallel. Additionally, steps may be subdivided or combined. Thus, while the various steps in the included flowcharts are presented and described sequentially, one of ordinary skill will appreciate that some or all steps may be executed in different orders, may be combined or omitted, and some or all steps may be executed in parallel.

As disclosed herein, software may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of automatically and dynamically allocating resources in a distributed computer system, comprising:
    collecting historical resource usage data using a system log;
    estimating a completion time of a desired operation;

predicting an n-step ahead compute usage to generate forecasted usage data based on a number of defined usage levels;

dynamically throttling availability of a resource based on the forecasted usage and a corresponding usage level;

continuously adjusting dynamically throttle values based on deviation of actual utilization of the resource from the forecasted usage;

deriving a transition set comprising transitions between usage levels in a historical and forecasted plot of computing percentage over time;

analyzing the transition points to identify single point spike conditions that result from transitions back and forth between two usage levels within a defined short time period; and removing the single point spikes from the transition set.

2. The method of claim 1 wherein the different usage levels comprise three usage levels denoted low, medium, and high usage.

3. The method of claim 2 wherein the distributed computer system comprises a storage network executing a deduplication backup process, and wherein the storage network comprises at least part of a cloud computer network and a virtualized computer network.

4. The method of claim 3 wherein the resources comprise at least one of: central processing unit (CPU) usage, storage disk input/output (I/O) cycles, network bandwidth, and memory space utilization, and wherein the multiple variables of the multivariate time-series analysis comprise at least CPU usage, disk I/O, network bandwidth and memory utilization.

5. The method of claim 4 wherein the desired operation is selected from one of: cloud data migration, replication to a storage server, system upgrades, bandwidth throttling in storage networks, and garbage collection.

6. The method of claim 5 wherein the default throttle map defines a throttle value limiting availability of a resource proportional to an increased usage level, and increasing availability of the resource proportional to a decreased usage level.

7. The method of claim 1 wherein system log comprises one of a Linux system activity report (sar), an I/O statistics reporter, and a system performance log, and wherein n-step ahead compute usage comprises a time-series analysis that is performed using Probabilistic Weighted Fuzzy Time Series (PWFTS) for forecasting compute resource usage.

8. A system for automatically and dynamically allocating resources in a distributed computer system, comprising:

a data collector collecting historical resource usage data using a system log;

a predictor estimating a completion time of a desired operation, and predicting an n-step ahead compute usage to generate forecasted usage data based on a number of defined usage levels;

a throttling component dynamically throttling availability of a resource based on the forecasted usage and a corresponding usage level, and continuously adjusting dynamically throttle values based on deviation of actual utilization of the resource from the forecasted usage;

a graphical user interface (GUI) component deriving a transition set comprising transitions between usage levels in a historical and forecasted plot of computing percentage over time; and an analyzer analyzing the transition points to identify single point spike conditions that result from transitions back and forth between two usage levels within a defined short time period, and removing the single point spikes from the transition set.

9. The system of claim 8 wherein the different usage levels comprise three usage levels denoted low, medium, and high usage.

10. A method for automatically and dynamically allocating resources in a distributed computer system, comprising:

collecting, in a data collector historical resource usage data using a system log;

a predictor estimating a completion time of a desired operation, and predicting an n-step ahead compute usage to generate forecasted usage data based on a number of defined usage levels;

dynamically throttling availability of a resource based on the forecasted usage and a corresponding usage level, and continuously adjusting dynamically throttle values based on deviation of actual utilization of the resource from the forecasted usage;

deriving a transition set comprising transitions between usage levels in a historical and forecasted plot of computing percentage over time; and analyzing the transition points to identify single point spike conditions that result from transitions back and forth between two usage levels within a defined short time period, and removing the single point spikes from the transition set.

11. The method of claim 10 wherein the different usage levels comprise three usage levels denoted low, medium, and high usage.

* * * * *